United States Patent Office 3,733,314
Patented May 15, 1973

3,733,314
PURIFICATION OF AMORPHOUS POLYOLEFINS
Stanley J. Marwil and Roy C. Harrison, Bartlesville, Okla., assignors to Phillips Petroleum Company
No Drawing. Filed Feb. 3, 1971, Ser. No. 112,434
Int. Cl. C08f *3/02, 3/08*
U.S. Cl. 260—93.7
13 Claims

ABSTRACT OF THE DISCLOSURE

Crude amorphous polyolefins are purified in a sequential treatment process with a reducing type inorganic compound, a polyphosphate, and an alcohol. The amorphous polyolefin is recovered as a safe-to-handle, essentially color-free and catalyst residue-free, useful material.

FIELD OF THE INVENTION

This invention relates to methods of purifying crude amorphous polyolefins. It further relates to the separation of amorphous polyolefins from discoloring components and catalyst residues.

In the production of crystalline polyolefins, there also is produced varying amounts of presently unusable material, amorphous polyolefins. The amorphous material usually is darkly discolored, contains considerable amounts of catalyst residues, is highly viscous, corrosive, and quite flammable. Present methods of disposal include burying or incineration, both of which result in considerable cost, waste, and potential ground or atmospheric pollution.

The crude amorphous polyolefins as produced are worthless because of the content of catalyst residues and other contaminants. However, the amorphous polyolefins potentially are valuable materials, once freed of contaminating agents and discoloring materials. They have potential usages as electronic cable filler fluids, as hot melt adhesive components, and the like. The problem is economical and effective recovery. Prior methods of recovery have included treatment with organic acids, alcohols, hot water, caustics, or various combinations of these steps.

It is the object of our invention to recover useful refined amorphous polyolefins.

A further object of our invention is to separate catalyst residues from crude amorphous polyolefins.

Certainly it is an object of our invention to avoid or reduce further wastage of potentially valuable polymeric materials.

An object of our invention, accordingly, is to accomplish the above objectives with an effective and economical approach.

Other aspects, objects, and the several advantages of our invention will be apparent to one skilled in the art from a perusal of the following description and our appended claims.

SUMMARY OF THE INVENTION

We have discovered a method of sequential treatment of the crude amorphous polymer, a sequential treatment method that is highly effective, yet relatively quite economical compared to other methods. It not only is more economical than using many other chemical treatments, but much safer to use than handling hot alcohols, hot acids, hot caustics, and the like. The method produces a clean useful product.

Our invention lies in discovery of a method of treatment of crude amorphous polyolefin by which the crude material is first treated with an aqueous solution of an inorganic reducing type compound; secondly with an inorganic phosphate aqueous solution; and thirdly with an alcohol-water solution. One or more of the steps can be repeated, such as repeating step 2 or the second wash before proceeding to the third step. This sequence of treating, and the components of the aqueous solutions, effectively purify the crude amorphous product.

The crude amorphous product preferably is handled in glass-lined equipment or the like, or in stainless steel equipment, with due safety precautions. Here again is a particular advantage of our method in treating the material with aqueous solutions initially, without initial contacting with potentially flammable materials such as alcohols. After the first stages of our treatment, the material is much safer to handle, relatively non-flammable, and the final alcohol wash can be conducted with relative ease.

DETAILED DESCRIPTION OF THE INVENTION

The amorphous polyolefin by-product is produced in all known polymerization processes for the olefins. Our invention thus can be applied to advantage in its various aspects to polymers of olefins generally and to any method of producing such polymers including any catalyst system.

Our invention can be used to remove metal-containing polymerization catalyst residues from polymers of 1-olefins, these polymerization catalysts having at least one solid component tending to remain with the polymer as an impurity therein. Our method of sequential treatment is particularly useful in the recovery of polymers of 1-olefins from a polymerization process using an organo-metal catalyst system, or using a supported metal oxide such as chromium oxide associated with at least one oxide such as alumina, silica, and the like. Ordinarily, the 1-olefin monomers have up to 8 carbon atoms per molecule, such as propylene, 1-butene, 1-pentene, 4-methyl-1-pentene, 3-methyl-1-butene, 3,3-dimethyl-1-butene, and the like, either as single monomers, or as comonomers and the like.

Our invention also is applicable to the polymerization of one or more 1-olefins where a comonomer polymerizable therewith also is used, and such comonomer can constitute as much as 25 weight percent of the total monomers present. Such polymerizable comonomers include the vinyl and vinylidine monomers of up to about 12 carbon atoms per molecule, and also can include the vinyl-substituted aromatic compounds of up to about 12 carbon atoms per molecule.

Since the production of polypropylenes presently is of the most importance commercially, and consequently the largest amounts of crude amorphous polyolefin produced are the crude amorphous polypropylenes, our description following will be couched particularly in terms of polypropylene. However, this should not be limitative of the scope of our invention, but only illustrative, since our invention is applicable to the crude amorphous polyolefins generally, and to metal-catalyst systems generally which leave catalyst residues.

In a typical process, a liquid 1-olefin such as propylene is contacted with a metal catalyst, such as $TiCl_3 \cdot \frac{1}{3} AlCl_3$ plus diethylaluminum chloride typically in about a 1:2 weight ratio, at a temperature of about 130° F., a pressure of about 320 p.s.i.g., and a residence time in the reactor of the order of 2.5 hours. Productivity typically ranges from about 500 to 3,000 pounds of total polymer per pound of catalyst.

The solid or crystalline portion of the polyolefin product is separated from the amorphous polymer and catalyst residues by contacting the polymerizate in a wash column with a material such as liquid propylene containing a chelating agent such as acetylacetone, frequently along with propylene oxide. The latter two agents solubilize the amorphous material plus the catalyst residue, acting as a chelating agent particularly for the catalyst residue, thus leaving the commercially useful crystalline material to be recovered and further treated as may be necessary. The crude amorphous material containing the catalyst residues as metal chelates is recovered by removal of the solvents by any conventional method such as flash vaporization. The solvents then can be recovered and recycled if desired.

The crude amorphous polyolefin, or particularly since we are using the polypropylenes as examples, the crude amorphous polypropylene, consists primarily of the amorphous polypropylene itself, the catalyst residues now generally in the form of metal chelates, various discoloring materials, the catalyst extracting agents including acetylacetone which causes objectionable odor, propylene oxide, other materials such as propylene chlorohydrins, and residual polymerization diluent or solvent or by-product such as pentane. In general, the crude material at this point contains anything that is soluble in the liquid extractants used to cleanse or wash the crystalline material.

The amount of crude material may range widely relative to the total amount of polymer produced, more usually it is in the area of from 2 to 15 weight percent, and more frequently from 4 to about 7 weight percent. The amount of catalyst residues, in the form of metal chelates, will range usually from 3 to 5 weight percent of the crude product, though again this is variable. The amount of amorphous polypropylene itself actually may be of the order of about ⅔ by weight of the total crude material.

The first step in treatment of the separated crude amorphous polyolefin is with an aqueous wash containing a reducing type inorganic salt. These salts can be those of the alkali metals including lithium, sodium, potassium, rubidium, cesium, or of ammonia. The reducing type salts include the sulfites, dithionites, nitrites, and iodides. These salts can be used as the anhydrous or as the hydrated form, or as the partial salts such as the sodium hydrogen sulfite and the like. Of course, these salts can be used in combination if desired.

The reducing type inorganic compound solutions should be made up using a generally aqueous base, and in a concentration range of about 1 to 15 percent by weight of the inorganic reducing type compound, more usually between 2 and 5 weight percent.

The pH of the first wash solution should be slightly alkaline, generally in the range of 7 to 10, and can be adjusted by the use of any mildly alkaline material known to the art. Some of the alkaline salts, such as sodium sulfite, are mildly alkaline and tend to adjust the pH toward about 8.5 when used with water that itself is essentially unbuffered. Where desired, other alkaline materials can be employed in minor amount, such as ammonium or alkali metal bicarbonates, carbonates in anhydrous or any hydrated form, or an alkaline inorganic phosphate can be employed if desired.

Our second aqueous solution contains an ammonium or an alkali metal polyphosphate, with the alkali metal being as defined hereinabove. A wide range of polyphosphates are suitable and effective. For example, sodium hypophosphate $Na_2H_2P_2O_6 \cdot 6H_2O$; sodium, dihydrogen hypophosphate $Na_4H_2P_2O_6 \cdot 6H_2O$; sodium hexametaphosphate $(NaPO_3)_6$; sodium trimetaphosphate $$(NaPO_3)_3 \cdot 6H_2O$$

sodium pyrophosphate $Na_4P_2O_7 \cdot H_2O$; sodium dihydrogen pyrophosphate $Na_2H_2P_2O_7 \cdot 6H_2O$; sodium triphosphate 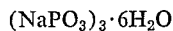 $Na_5P_3O_{10}$, often termed the tripolyphosphate; and any of the equivalent ammonium or other alkali metal polyphosphates, their anhydrous, partially hydrated, or fully hydrated forms, and including any of the other sometimes less clearly defined materials classified as the polyphosphate glasses. Of course, mixtures or combinations of the polyphosphates, or mixtures or combinations of the various alkali metal or ammonium salts thereof, can be used where desired.

The concentration range for the polyphosphate wash solution, our second aqueous solution, should be in the general range of about 1 to 15 weight percent, more usually between 2 and 5 weight percent, based on the weight of phosphorus, expressed as $PO_4$, in solution.

The third wash solution is an aqueous alcohol wash. The alcohol content thereof can be chosen from one or more of the lower monoalcohols or dialcohols, specifically those of from 1 to 4 carbon atoms per molecule, including methanol, ethanol, ether of the propanols, any of the several butanols, or the glycols such as ethylene glycol.

The range of alcohol content in our third aqueous solution generally should be in the range of between about 3 and 15 weight percent of alcohol, preferably 5 to 10 weight percent of alcohol, based on the total solution. Of course, two or more alcohols can be used in admixture, if desired, and the weight percent then represents the total alcohol content of the solution. The presently preferred alcohol is methanol, primarily because of its availability and economy, as well as general effectiveness.

The pH values of our second and third aqueous solutions are not critical, and there is no necessity to adjust their respective pH values insofar as the effectiveness of treatment of the amorphous polyolefin is concerned. Acidic, neutral, or alkaline conditions appear to be equally suitable. As has been noted, the crude amorphous polyolefin itself tends to be corrosive. Therefore, at times, adjustment of the pH of the aqueous solutions to moderately alkaline ranges of above about 7 on the conventional pH scale by addition of suitable alkaline materials such as ammonia, ammonium hydroxide, an alkali metal hydroxide, an alkali metal carbonate, and the like, one or more, may be helpful from a corrosion control standpoint, since such adjustment will not interfere with the process and method of purification according to our invention.

The actual contacting of the crude amorphous polyolefin with each of the treating solutions should be at a temperature of about 100° to about 300° F., preferably 175° to 250° F., and at a suitable pressure at least sufficient to avoid flashing of the solutions or constituents thereof at the contacting temperatures selected, usually of about 15 to 100 p.s.i.a. Contacting time for each treatment step should be in the range of 10 minutes to 2 hours, more usually 30 minutes to 1 hour.

Any convenient method of contacting is suitable, with methods employable and known to the plastics and polymer treating arts. A convenient method is to charge the crude amorphous polyolefin to a treating vessel, suitable for use at elevated temperautres and pressures, and provide agitation such as by means of stirrers.

Of course, while the usual sequence is treatment with our first solution, then the second solution, then the third solution, yet it is entirely feasible to repeat a step, where desired, one or more times, depending on the particular type and variety of crude material to be cleaned, its degree and type of contamination, and the like.

After sequential treatment with each of our aqueous solutions, the polymer phase, under the temperature and pressure utilized, generally remains on top, and each aqueous wash solution further containing solids and extracted materials in solution or dispersion tends to settle to the bottom, and can be drained off for reuse, or disposal. Between the sequential steps, a suitable settling period, usually of about 15 to 30 minutes, is helpful to permit adequate phase separation. During phase separations it frequently is useful to employ nitrogen or other inert gas atmosphere, usually at slight positive pressure such as of a few pounds to 100 p.s.i.a., frequently about 60 p.s.i.a.

EXAMPLES

The following exemplary data demonstrate the effectiveness of our invention. The particular materials used, individual species, and the crude material itself which we refined, as well as values shown for the purified products in our examples, should be considered illustrative and not limitative of the extent and scope of our invention. Commercial requirements for purified or refined amorphous polyolefins are not necessarily similar to requirements for crystalline polyolefins.

Example I

Crude amorphous polypropylene was recovered by washing from the crystalline polypropylene using propylene as washing agent. The crude material was fractionated and flash concentrated to recover the solvent, i.e., polypropylene. Bottoms from flash concentration of the crude material had the following composition:

TABLE I

| Component: | Weight percent |
|---|---|
| Metal chelates | 3.8 |
| Acetylacetone | 16.7 |
| Propylene chlorohydrins | 1.0 |
| Propylene oxide | 4.6 |
| Pentane | 7.2 |
| Amorphous polypropylene | 66.7 |

A sample of the bottoms material as described above was charged to a mixing vessel equipped with a steam injection nozzle and means for applying vacuum. The vessel was charged to approximately the 40 percent volume level, and then heated by external heating source to between 250° and 300° F. The vessel pressure was reduced to approximately 25 inches of mercury vacuum and held at this level for 30 minutes.

The pressure then was increased to atmospheric pressure, and steam was admitted to the vessel for steam stripping. After 30 minutes of steam stripping, a first aqueous solution containing 2 weight percent sodium hydrogen sulfite $NaHSO_3$ was admitted to the vessel until the vessel level reached about 80 percent volume content. The vessel temperature was adjusted upwardly to 300° F., and agitation was continued for 30 minutes. Agitation then was stopped and the contents of the vessel allowed to settle for 30 minutes.

The polymeric phase remained on the top of the vessel contents, and the aqueous phase containing solids settled or separated to the bottom. The water and solids were drained from the bottom of the vessel.

Using similar procedures, subsequent wash and settling and separation was conducted using the following solutions:

TABLE II

| Wash step: | Chemical solution added |
|---|---|
| 2 | 10 wt. percent $NaP_2O_7 \cdot 10H_2O$ in water. |
| 3 | 10 wt. percent $NaP_2O_7 \cdot 10H_2O$ in water. |
| 4 | 10 wt. percent methanol in water. |
| 5 | 10 wt. percent methanol in water. |

After the third wash step above, the ash content of the amorphous phase was checked, and found at less than 0.02 weight percent. The titanium and the aluminum content was about 30 p.p.m. (parts per million by weight) expressed as the element.

At the end of the final wash step as indicated above, the polymeric phase, the purified amorphous polypropylene, was found to contain less than 1 p.p.m. acetylacetone. The product was water white, and without visual detection of discoloration, nor of odor.

Example II

Similar tests were made on samples of crude amorphous polypropylene as described in Example I, Table I, above, except omitting the initial vacuum distillation and steam stripping steps.

Washing was with the same sequence as described in Example I, Table II, except that at step 3, a 2 weight percent $Na_4P_2O_7 \cdot 10H_2O$ in water solution was utilized. Otherwise, the steps, times, treatment sequence and solutions were as shown in Example I above.

The results after the stepwise sequence washing process of our invention showed a residual acetylacetone content of less than about 9 p.p.m.

The purified atactic polypropylene from the washing process of Example II then was subjected to steam stripping and vacuum distillation. Acetylacetone content was too low to be measured.

Example III

Comparative runs were made on the same crude product, but using repeated hot water washes only, without addition of chemicals, followed by steam stripping in vacuum. However, this was ineffective in that acetylacetone could not be reduced below about 7 p.p.m.

Further comparative runs were made using hot methanol washes only, with the result that the acetylacetone was removed, but such treatment did not break up nor remove the metal chelates, thus leaving such material behind in the thus only partially treated crude polypropylene.

Further runs were made employing hot water washing only, with results similar to that with the hot methanol above.

After the multiple step washing process according to our invention, further conventional treatments can be applied to the purified amorphous product, including steam stripping, vacuum drying, thin film evaporating, addition of stabilizers and other additives, and such other handlings of the polymer as may be desired for its use in various applications.

Reasonable variations and modifications of our invention are possible within the scope of our disclosure without departing from the scope and spirit thereof as disclosed in this specification and claims.

We claim:

1. A process for the purification of crude amorphous poly-1-monoolefin, said crude amorphous poly-1-monoolefin being one of the polymeric products of polymerization under polymerization conditions of at least one 1-monoolefin containing up to about 8 carbon atoms together with from 0 to 25 weight percent of a comonomer polymerizable therewith, and a polymerization catalyst tending to leave metal-containing catalyst residues in said poly-1-monoolefin, which comprises:

(a) contacting said crude amorphous poly-1-monoolefin at least once with an aqueous solution comprising an inorganic reducing type compound and water wherein said inorganic reducing type compound is an ammonium or alkali metal sulfite, dithionite, nitrite, or iodide, (b) contacting said amorphous poly-1-monoolefin from said step (a) at least once with a second aqueous solution comprising an inorganic polyphosphate and water wherein said inorganic polyphosphate is an ammonium or alkali metal polyphosphate, (c) contacting said amorphous poly-1-monoolefin from said step (b) at least once with a third aqueous solution comprising an alcohol and water, and (d) recovering the now purified amorphous poly-1-monoolefin as a product.

2. The process according to claim 1 wherein said first aqueous solution contains from 1 to 15 percent by weight of said inorganic reducing type compound, and said alkali metal is lithium, sodium, potassium, rubidium, or cesium; said second aqueous solution contains from 1 to 15 weight percent of said inorganic polyphosphate, and said inorganic polyphosphate is an ammonium or alkali metal hypophosphate, hexametaphosphate, trimetaphosphate, pyrophosphate, triphosphate or glassy phosphate; and said third aqueous solution contains from 3 to 15 weight percent of said alcohol, and said alcohol is a lower mono or dialcohol containing up to 4 carbon atoms per molecule.

3. The process according to claim 2 wherein prior to said step (a) said crude amorphous polyolefin is subjected to at least one of vacuum distillation and steam stripping.

4. The process according to claim 2 wherein said recovered purified amorphous polyolefin further is subjected to at least one of steam stripping, vacuum drying, prior to final recovery as said product.

5. The process according to claim 2 wherein said contacting is at a temperature of from 100 to 300° F., and at a pressure sufficient to maintain said aqueous solutions substantially in the liquid phase.

6. The process according to claim 5 wherein between each said contacting step, the polymer phase and aqueous solution phase are permitted to separate for a time sufficient to permit adequate phase separation, and during which time an inert gas blanket is maintained over said phases.

7. The process according to claim 5 wherein subsequent to said step (a) and prior to step (b) an intervening separation step is employed substantially separating the washed amorphous poly-1-monoolefin from said step (a), and wherein a similar separation step also is employed after said step (b) and prior to said step (c).

8. The process according to claim 7 wherein at least one of said first, second, and third aqueous solutions further include a sufficient amount of an alkaline material selected from at least one of ammonium and alkali metal hydroxides, ammonia, ammonium and alkali metal carbonates, ammonium and alkali metal phosphates and polyphosphate, sufficient to maintain the pH of said at least one said solution on the alkaline side of the pH scale.

9. The process according to claim 8 wherein the pH of said first aqueous solution is from 7 to 10, said pressure is from 15 to 100 p.s.i.a., and said contacting is conducted during a time of from 10 minutes to 2 hours.

10. The process according to claim 9 wherein said first aqueous solution is an alkali metal sulfite or dithionite, said second aqueous solution is an alkali metal pyrophosphate, said third aqueous solution is methanol; and said polyolefin is a polypropylene.

11. The process of claim 1 wherein one or more of said steps (a), (b), or (c) are repeated.

12. A process for the purification of crude amorphous polymonoolefin, said crude amorphous poly-1-monoolefin containing metal-containing catalyst residues substantially metal chelates, which purification process comprises:

(a) contacting said crude amorphous poly-1-monoolefin at least once with a first aqueous solution comprising an inorganic reducing type compound and water, wherein said inorganic reducing type compound comprises ammonium or alkali metal sulfites, dithionite, nitrite, or iodide and said alkali metal is lithium, sodium, potassium, rubidium, or cesium,
   wherein the concentration of said inorganic reducing type compound in said first aqueous solution is in the range of about 1 to 15 percent by weight, and wherein the pH of said first aqueous solution is in the range of about 7 to 10;

(b) settling the admixture from said step (a), thereby producing an upper polymer phase and a lower aqueous layer, (c) separating the polymer phase from said step (b), (d) contacting the separated polymer phase from said step (c) at least once with a second aqueous solution comprising an inorganic polyphosphate and water, wherein said inorganic polyphosphate is an ammonium or alkali metal polyphosphate, and wherein the concentration of said inorganic polyphosphate in said second aqueous solution is in the range of about 1 to 15 weight percent.

(e) settling the admixture from said step (d) thereby producing an upper polymer phase and a lower aqueous layer, (f) separating the polymer phase from said step (e), (g) contacting the separated polymer phase from said step (f) at least once with a third aqueous solution comprising an alcohol and water, wherein the alcohol content of said third aqueous solution represents about 3 to 15 weight percent;

(h) settling the admixture from said step (g) thereby producing an upper polymer phase, and a lower aqueous layer, (i) separating the polymer phase from said step (h), and (j) recovering the now purified amorphous poly-1-monoolefin as product;
   wherein said settling is conducted for an interval of about 15 to 30 minutes in each of said steps (b), (e), and (h), and
   wherein said contacting in each of said steps (a), (d), and (g) is conducted at a temperature of about 100 to 300° F.

13. The process of claim 12 wherein said poly-1-monoolefin is polypropylene or polypropylene with up to 25 weight percent of copolymerized monomer copolymerizable with propylene; said amorphous poly-1-monoolefin is a polymeric product of the polymerization of propylene and from 0 to 25 weight percent of a monomer copolymerizable therewith, employing a catalyst comprising

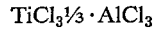

and diethylaluminum chloride, under polymerization conditions; and wherein in said metal chelates the chelating agents comprise acetylacetone and propylene oxide.

References Cited
UNITED STATES PATENTS

| | | | |
|---|---|---|---|
| 3,197,454 | 7/1965 | Plaster | 260—93.7 |
| 3,255,166 | 6/1966 | Bernhardt et al. | 260—88.2 |
| 3,423,384 | 1/1969 | Hagenmeyer et al. | 260—93.7 |

JOSEPH L. SCHOFER, Primary Examiner

W. F. HAMROCK, Assistant Examiner

U.S. Cl. X.R.

260—88.2 S, 94.9 F